US005726348A

United States Patent [19]
Draghi et al.

[11] Patent Number: 5,726,348
[45] Date of Patent: Mar. 10, 1998

[54] PROCESS FOR PRECISELY CLOSING OFF COOLING HOLES OF AN AIRFOIL

[75] Inventors: Peter J. Draghi, Simsbury; Brian J. Shurman, Plantsville; Michael V. Borruso, Coventry, all of Conn.

[73] Assignee: United Technologies Corporation, Hartford, Conn.

[21] Appl. No.: 666,880

[22] Filed: Jun. 25, 1996

[51] Int. Cl.⁶ .................................................. G01M 3/02
[52] U.S. Cl. .................................................. 73/37
[58] Field of Search .................................. 73/37; 29/530; 156/272.2, 275.5

[56] References Cited

U.S. PATENT DOCUMENTS

| 3,576,065 | 4/1971 | Frazier | 29/530 |
| 4,284,662 | 8/1981 | Matsuzaki et al. | 427/68 |
| 4,598,037 | 7/1986 | Felten | 430/281 |
| 4,672,727 | 6/1987 | Field | 29/530 |
| 5,240,817 | 8/1993 | Stout et al. | 430/315 |
| 5,346,397 | 9/1994 | Braiman | 433/223 |
| 5,477,008 | 12/1995 | Pasqualoni et al. | 174/52.3 |

Primary Examiner—Hezron E. Williams
Assistant Examiner—Jay L. Politzer
Attorney, Agent, or Firm—Bachman & LaPointe, P.C.

[57] ABSTRACT

A process for closing cooling holes of an airfoil includes the steps of providing an airfoil having a plurality of cooling holes, closing desired holes of said plurality of cooling holes by applying an ultraviolet curable material over the holes.

8 Claims, 1 Drawing Sheet

5,726,348

PROCESS FOR PRECISELY CLOSING OFF COOLING HOLES OF AN AIRFOIL

BACKGROUND OF THE INVENTION

The present invention relates to a process for precisely closing specific cooling holes of an airfoil in connection with the testing of such cooling holes.

Turbine airfoils have numerous cooling holes opening into cooling passages within the airfoil. The cooling holes are typically arranged in numerous rows on the airfoil as desired. During the testing and repair of airfoils, it is necessary to ensure the proper operation of various air holes. In this regard, it is typically necessary to test proper air flow through holes which are located in close proximity to other holes, for example within about 0.050 inches of each other, thereby requiring some method of masking or blocking the holes which are not to be tested.

Conventionally, waxes, lacquers, tapes and other organic coatings have been applied in an attempt to close off holes which are not to be tested. However, such materials do not have the desired edge retention which is necessary to precisely close holes which are in close proximity to other holes which are to be left open for air flow. Thus, the conventional wax or other material tends to peel away from the airfoil limiting the effectiveness of closing of the holes.

Epoxies are also conventionally available, but require proper mixing and extended cure time, thereby rendering them undesirable for use in accordance with the testing of cooling holes in airfoils.

In accordance with the foregoing, the need exists for a process for precisely closing or screening selected cooling holes so as to leave other holes, in close proximity thereto, open for testing.

SUMMARY OF THE INVENTION

It is therefore the primary object of the present invention to provide a process for closing selected holes of a plurality of holes on an airfoil.

It is a further object of the present invention to provide a process as above which utilizes a material for closing holes which has sufficient viscosity that it remains where applied until cured.

It is a still further object of the present invention to provide a process for selectively and precisely closing holes on an airfoil which reduces the expense and time associated with such closure, thereby enhancing the efficiency of the airfoil treating process.

It is another object of the present invention to provide a process for closing selected holes on an airfoil wherein the closing material is readily removed.

The foregoing objects are achieved by the process of the present invention.

In accordance with the present invention, a process is provided for closing selected cooling holes of an airfoil, which comprises the steps of providing an airfoil having a plurality of cooling holes, and closing desired holes of said plurality of cooling holes by applying an ultraviolet curable material over said holes.

Still further in accordance with the invention, a process is provided for selectively testing specific cooling holes of a plurality of cooling holes on an airfoil, which process comprises the steps of providing an airfoil having a plurality of cooling holes, selecting specific holes of said plurality of cooling holes to be tested, closing non-selected holes of said plurality of cooling holes by applying an ultraviolet curable material over said non-selected holes, and testing air flow through said selected holes.

Other objects and advantages associated with the process of the present invention are set forth in the following detailed description and the accompanying drawings in which like reference numerals depict like elements.

DETAILED DESCRIPTION OF THE PREFERRED EMBODIMENT(S)

Figure 1:
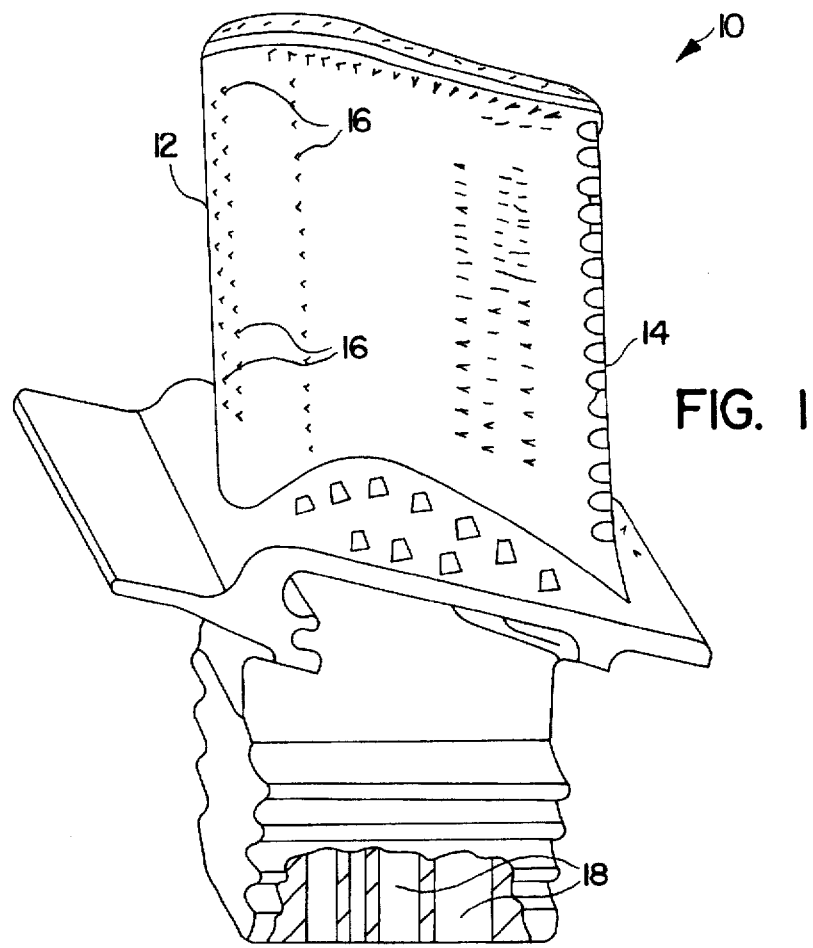
FIG. 1 is a perspective view of a turbine blade airfoil.
Figure 2:
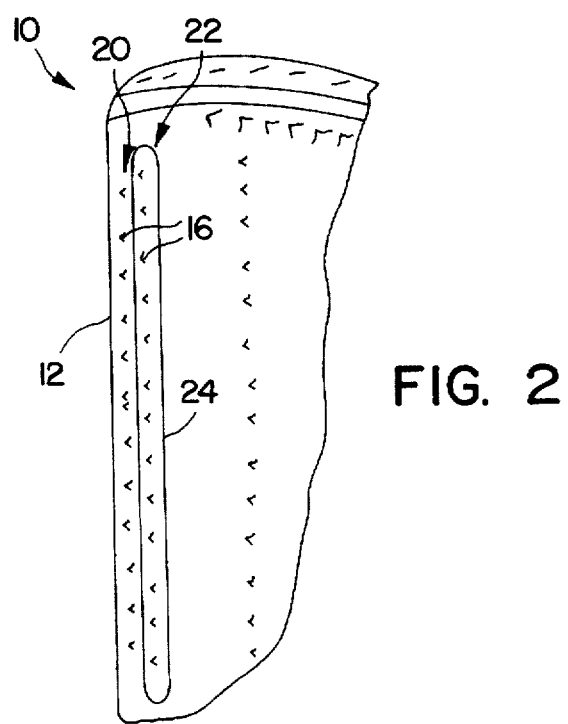
FIG. 2 is an enlarged partially sectioned away portion of the airfoil of FIG. 1 illustrating the leading edge and precision closed holes of the leading edge in accordance with the invention.

As shown in FIGS. 1 and 2, a typical turbine blade airfoil 10 has a leading edge 12, a trailing edge 14, and a plurality of rows of cooling holes referred to generally as 16 which holes 16 lead to cooling passages 18 within airfoil 10.

During various treating and repair procedures to which an airfoil 10 may be subjected, it is necessary to ensure the unrestricted flow through various selective rows of holes 16, which testing must be accomplished by closing off other rows of holes. Some of these holes are positioned in rows which are in close proximity to each other. For example, at leading edge 12, two rows 20, 22 are illustrated which may typically be within about 0.050 inches of each other. It is preferable and in some cases required to test the flow of air through one row 20 of holes with the other row 22 of holes closed, masked or otherwise blocked, and vice versa. Conventionally, blocking row 22 of holes while leaving row 20 of holes free is problematical due to the lack of a suitable material having sufficient edge retention and strength to successfully block the desired holes in row 22 while leaving the holes in row 20 free. Currently used materials such as waxes and tapes do not have the edge retention required and therefore tend to come free from the closed off holes during treatment. Alternatively, conventionally used epoxies require proper mixing and are characterized by long cure times which undesirably lengthen the treatment process.

In accordance with the present invention, it has been found that the material 24 (FIG. 2) used to close off specific desired holes preferably demonstrates certain properties. For example, material 24 preferably has sufficient adhesive properties that edges of the material do not lift and leak during air treatment procedures. Further, material 24 preferably has a viscosity such that it remains in place when applied in liquid form, without exhibiting sagging or running prior to curing thereof. It is also desirable that material 24 be such that only a minimum amount of material must be applied to a particular hole or row of holes to close same as desired. Additionally, it has been found in accordance with the present invention that material 24 should preferably be easily removed after testing.

In accordance with the present invention, it has been found that a particularly useful material 24 is an ultraviolet curable material, especially an ultraviolet curable acrylic material, which is advantageous in that it has been found to possess the desired adhesive and viscosity properties as well as edge retention so that material 24 can be applied to holes which are in close proximity to other holes which are not to be closed.

It has also been found that the ultraviolet curable acrylic material of the present invention is desirable in that the curing step is accomplished in a significantly decreased amount of time with respect to conventional materials such as epoxies which, as mentioned above, require significant curing times.

Further, in accordance with the process of the present invention, holes and rows of holes may be precisely closed for testing even with holes to be tested and holes to be closed which are positioned on the airfoil within about 0.050 inches of each other.

An example of a suitable ultraviolet curable material which can be used in the process of the present invention is an acrylic adhesive which can be activated by actinic radiation such as ultraviolet radiation. One such material is sold under the tradename DYMAX 29605. This material is a reactive acrylic adhesive activated by actinic radiation which includes, in addition to a photoinitiator, at least about 1.0 wt % of a perester compound or cumene hydroperoxide, and 0.5 wt % of a tautomeric organic acid. This material is further described in U.S. Pat. No. 5,039,715 to Bachmann et al. which is incorporated herein by reference.

In accordance with the process of the present invention, the ultraviolet curable material 24 (see FIG. 2) is applied over desired holes such as row 22 of holes, preferably in liquid form. The viscosity and adhesive qualities of material 24 are such that row 22 of holes can be covered with material 24 leaving row 20 of holes, within about 0.050 inches of row 22, completely free of material 24 for testing thereof. In most instances, only a single coat of masking material is required to close the desired hole or holes. Of course, additional coats of material 24 may be used if desired. After the ultraviolet curable material 24 has been applied to desired holes of airfoil 10, the airfoil is exposed to ultraviolet radiation or light for a time period sufficient to cure material 24 in place thereby closing desired holes in accordance with the present invention. It has been found in accordance with the invention that exposing material 24 to ultraviolet light for a period of less than or equal to about 60 seconds is sufficient to cure material 24.

After curing, airfoil 10 is ready for further testing, specifically for testing of selected non-closed holes or rows of holes such as row 20 at leading edge 12 of airfoil 10. In this state, numerous flow treatments and other types of tests can be carried out on row 20 of holes, and material 24 advantageously remains in place over row 22 of holes due to the desirable edge retention and adhesive properties thereof.

Upon completion of testing, it is of course desirable to remove material 24 so as to re-open the holes in row 22. It may further be desirable to then close off row 20 of holes following the same procedure described above, for example to test flow through holes in row 22. In this regard, it has advantageously been found that material 24 according to the present invention can readily be removed by exposing same to an increased temperature, which may be less than or equal to about 1,000° F., so as to burn material 24 off and thereby re-open the hole. This removing step can, for example, be accomplished using environmentally approved furnaces, and complete removal of material 24 can be accomplished at temperatures of less than 1,000° F. without requiring mechanical procedures to re-open the formerly closed holes.

As can be seen from the foregoing discussion, the use of an ultraviolet curable material in closing off specific desired holes is quite beneficial. The ultraviolet curable material has excellent adhesive properties which allow the edges of the material 24 to adhere to surfaces of airfoil 10 without leaking. This is advantageous as over application or coating of material 24 beyond the required holes is not necessary.

Additionally, only a minimum amount of ultraviolet curable material must be applied to effectively close a specific hole. Thus, the process of the present invention provides a substantial time and cost saving by providing a process for closing desired holes which is accomplished in a significantly reduced amount of time, namely less than or equal to about 60 seconds for curing, and which requires a greatly reduced amount of material.

While the process of the present invention has been described in the context of closing off specific cooling holes or rows of holes of a turbine blade airfoil, it should be recognized that the process can be used to selectively close or block holes and other structures of any type of airfoil or other component.

It is apparent that there has been provided in accordance with this invention a process for selectively closing cooling holes of an airfoil which fully satisfies the objects, means and advantages set forth hereinbefore. While the invention has been described in combination with specific embodiments thereof, it is evident that may alternatives, modification, and variation will be apparent to those skilled in the art in light of the foregoing description. Accordingly, it is intended to embrace all such alternatives, modifications, and variations as fall within the spirit and broad scope of the appended claims.

What is claimed is:

1. A process for closing cooling holes of an airfoil, comprising the steps of:

providing an airfoil having a plurality of cooling holes, said cooling holes being arrayed on said airfoil in rows;

selectively applying to desired rows of said arrayed cooling holes an ultraviolet curable material for closing said desired rows of said arrayed cooling holes without closing off other rows of said arrayed cooling holes; and curing said ultraviolet curable material so as to close said desired holes.

2. A process according to claim 1, wherein said step of closing desired holes comprises applying said ultraviolet curable material in liquid form to said desired holes.

3. A process according to claim 1, wherein said step of closing desired holes comprises applying a reactive acrylic adhesive material activated by ultraviolet radiation.

4. A process according to claim 2, wherein said curing step comprises exposing said ultraviolet curable material to ultraviolet radiation for a period of less than or equal to about 60 seconds.

5. A process for testing air flow through specific cooling holes of an airfoil, comprising the steps of:

providing an airfoil having a plurality of cooling holes, said cooling holes being arrayed on said airfoil in rows;

selecting at least one row of specific holes of said plurality of cooling holes to be tested;

closing non-selected rows of holes of said plurality of cooling holes by applying an ultraviolet curable material over said non-selected holes;

curing said ultraviolet curable material so as to close said desired holes; and testing air flow through said selected holes.

6. A process according to claim 5, further comprising the step of removing said ultraviolet curable material from said non-selected holes by exposing said ultraviolet curable material to a temperature of less than or equal to about 1,000° F. so as to burn off said ultraviolet curable material and thereby reopen said non-selected holes.

7. A process according to claim 5, wherein said holes to be tested and said non-selected holes are positioned on said airfoil within about 0.050 inches of each other.

8. A process according to claim 5, wherein said airfoil has a leading edge having a plurality of rows of cooling holes thereon, and further comprising the steps of selecting at least one row of said plurality of rows for testing and closing remaining rows of said plurality of rows by applying said ultraviolet curable material to said remaining rows.

* * * * *